United States Patent [19]

Connor et al.

[11] 3,770,984

[45] Nov. 6, 1973

[54] FAST RECOVERY LOW DISTORTION LIMITER CIRCUIT

[75] Inventors: Dale C. Connor; Robert P. McDonough, both of Quincy, Ill.

[73] Assignee: Harris-Intertype Corporation, Cleveland, Ohio

[22] Filed: Mar. 3, 1971

[21] Appl. No.: 120,470

[52] U.S. Cl. .................. 307/237, 330/139, 330/141

[51] Int. Cl. ..... H03k 5/08, H03g 3/32, H03g 11/04

[58] Field of Search .................... 307/237; 330/139, 330/141

[56] References Cited

UNITED STATES PATENTS

| | | | |
|---|---|---|---|
| 3,441,866 | 4/1969 | Barber et al. | 330/29 |
| 2,957,074 | 10/1960 | Trevor | 325/319 X |
| 3,021,489 | 2/1962 | Nielsen | 330/139 X |
| 3,050,692 | 8/1962 | Willard | 330/139 X |
| 3,109,989 | 11/1963 | Muir | 330/141 X |

*Primary Examiner*—John Zazworsky

*Attorney*—Hill, Sherman, Meroni, Gross & Simpson

[57] ABSTRACT

A signal limiter for reducing and increasing the gain of a circuit with the required speed of response without introducing distortion in the limiter output. The limiter includes a variable gain circuit having an output coupled to a detector in a feedback loop. The detector develops a DC signal which is then coupled back to the gain control device to reduce or increase the gain in accordance with the output signal level. A charging circuit is coupled to a point between the detector and the gain controlling device to hold a high level signal appearing at the output of the detector for a given time interval. Switching means are then provided to discharge the charging circuit after the lapse of a predetermined time interval to allow the gain to return to normal. This assures that the gain of the gain controlling device will not fluctuate in response to every signal waveform peak. Such rapid fluctuations would result in distortion at the output of the limiter. The switching circuit consists of several forms. One of the forms comprises a transistor having a second charging circuit coupled to the emitter thereof. The discharge time of the second charging circuit allows the transistor to be turned on to discharge the main charging circuit and allow the gain of the gain controlling device to return to normal. In a second form, the second charging circuit is coupled to the base of the transistor, and the operation is similar to that described above. In a further embodiment, a switching means of any general configuration may be provided in shunt with the main charging circuit and operated according to a given timing sequence. In another embodiment, a zener diode may be used to discharge the principal charging circuit when the voltage applied to the anode thereof through a second charging circuit decreases to a given level.

6 Claims, 4 Drawing Figures

INVENTORS
DALE C. CONNOR
ROBERT P. McDONOUGH
BY Hill, Sherman, Meroni, Gross & Simpson ATTORNEYS INVENTORS
DALE C. CONNOR
ROBERT P. McDONOUGH
BY Hill, Sherman, Meroni, Gross & Simpson ATTORNEYS

FAST RECOVERY LOW DISTORTION LIMITER CIRCUIT

BACKGROUND OF THE INVENTION

FIELD OF THE INVENTION

The field of art to which this invention pertains is signal limiter circuits and in particular to circuits for producing accurate gain control while eliminating "distortion" of the output signal, and reducing the apparent affect called "pumping". The term pumping refers to the sound of back-ground, or other normally steady program content as it changes volume due to gain change of the limiter, resulting from level changes of the fore-ground, or most prominent program content.

SUMMARY OF THE INVENTION

It is an important feature of the present invention to provide an improved signal limiter circuit.

It is another feature of the present invention to provide a signal limiter circuit which eliminates "distortion" of the output signal.

It is a principal object of the present invention to provide an improved gain reduction circuit for a signal limiter.

It is another object of the present invention to provide a regulation circuit to control the rate of gain variation of a gain controlling device in a circuit limiter.

It is an additional object of the present invention to provide a feedback loop for a signal limiter circuit which has means for holding the gain of the gain controlling device at a low level after the lapse of the feedback signal which initially produced the low level gain.

It is a further object of the present invention to provide a limiter circuit as described above having a switching means in parallel with a primary charging circuit to hold a high level signal at the feedback input of a gain controlling device for a fixed time interval and to reduce the level of the signal in accordance with the operation of a second charging circuit.

It is an additional object of the present invention to provide a switching circuit as described above which includes a transistor having a RC circuit coupled to the emitter thereof for switching on the transistor after the discharge of the capacitor through the emitter resistance.

It is a further object of the present invention to provide a switching circuit as provided above which includes a zener diode having an RC parallel combination coupled to the anode thereof.

It is an additional object of the present invention to provide a switching circuit as described above wherein a transistor is utilized and wherein an RC combination is coupled to the base of the transistor and the feedback signal from the output of the limiter is coupled through the emitter-collector terminals thereof directly to the feedback input of the gain controlling device.

These and other objects, features and advantages of the invention will be readily apparent from the following description of a preferred embodiment thereof, taken conjunction with the accompanying drawings, although variations and modifications may be effected without departing from the spirit and scope of the novel concepts of the disclosure.

DESCRIPTION OF THE PREFERRED EMBODIMENT

Figure 1:
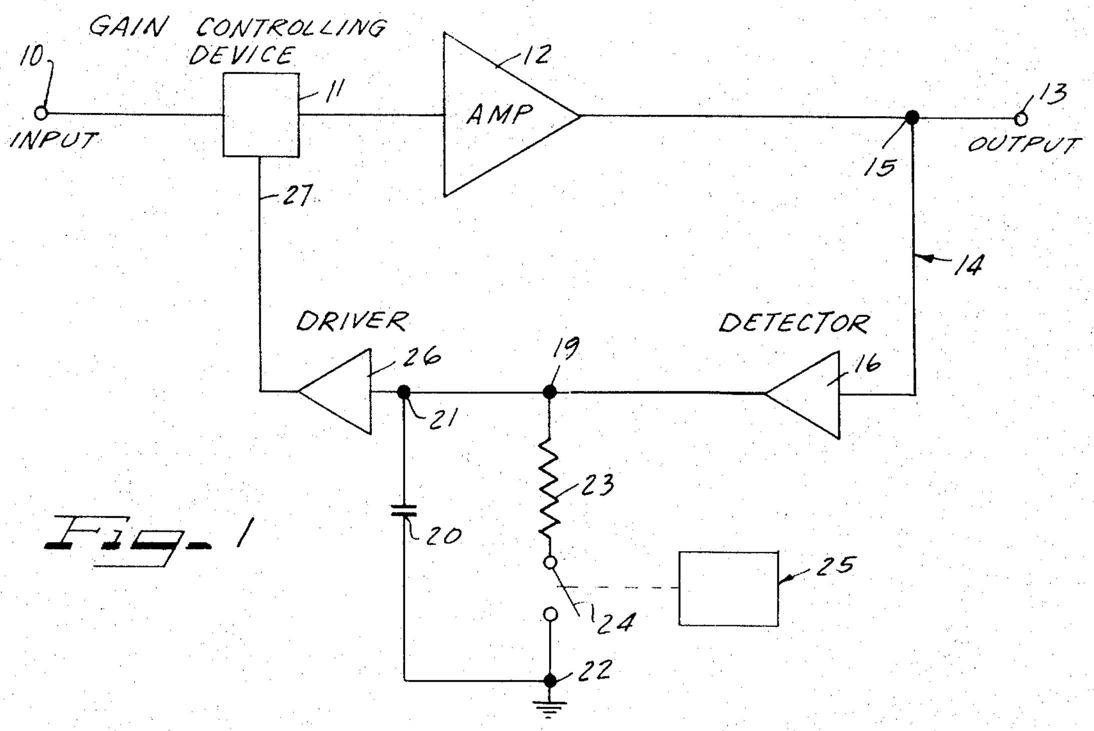
FIG. 1 is a schematic of a general circuit arrangement according to the present invention showing a switching device for shunting a charging circuit to control the rate of response of the feedback circuit to fluctuations in the output signal of the gain control device.

Limiter circuits generally employ a feedback loop to couple high level signals back to an amplifier for reducing the gain of the circuit with the objective of maintaining a substantially constant output. However, it has been found that if the gain controlling device of a limiter is too rapidly responsive to fluctuations in the output signal, this results in an undesirable distortion. The present invention provides a means for eliminating the distrotion without delaying the rapid response which is required also to maintain constant output. The present invention provides rapid gain reduction when a high level signal appears at the output but prevents the gain from restoring to its high level for a given time interval.

The main object of the invention is to eliminate (or at least reduce) the low-frequency distortion, which is caused by allowing the charging circuit to recover rapidly enough to partially recover on each peak of the signal waveform. The initial waveform peak, which exceeds the limiter threshold, will always be distorted as it is charging the charging circuit; however, subsequent recurring peaks will not be distorted if the charging circuit is not allowed to recover in the time interval between peaks.

As a result, a secondary object of the invention is to allow the limiter to have faster than normal recovery time with reduced low-frequency distortion. This faster recovery time allows maintaining more uniform peak output levels (because the gain does not stay low for as long a time period). These more uniform peak levels result in higher average signal level, one of the main objectives in designing and applying any limiter circuit.

"Pumping" is not objectionable with slow long recovery times, however, as the recovery time is made faster the changing of background noise or "pumping" sounds rather objectionable. We have found that if the recovery time is made very fast, the "pumping" sounds subjectively disappear because the gain changing is too fast to be perceptible. This would normally cause intolerable low-frequency distortion, however, the invention reduces this. Therefore an additional or secondary object is to eliminate, or at least reduce the subjective effects of "pumping".

Generally, this is accomplished in the present invention by means of a charging circuit which charges with high level output signal, and a switching circuit which is in shunt with the charging circuit and which discharges the circuit according to a timing of the switch. The switch timing can be achieved in a number of ways without departing from the spirit of the present invention. One such way of controlling the timing of the switch is to provide a transistor having the emitter to collector terminals connected in series with the feedback path and having a second charging cirucit coupled to the base of the transistor. In this arrangement, both charging circuits charge with high level output signal, and the decay of charge of the second charging circuit determines the turning on of the transistor which then discharges the primary charging circuit to allow the gain of the gain controlling device to increase. A further embodiment also utilizes a transistor with the second charging circuit coupled to the emitter of the transistor and with the emitter to collector terminals of the transistor being connected in parallel with the main charging circuit.

Still another embodiment of the switching action utilizes a zener diode having the anode of the zener diode coupled to the second charging circuit. The principal charging circuit discharges through the zener diode when the primary charging circuit has decayed to a given level.

Referring to the drawings in greater detail, FIG. 1 shows a limiter according to the present invention. The limiter has an input 10 which is coupled to a gain controlling deivce 11 and to an amplifier 12. The output of the amplifier is indicated generally at numeral 13. a feedback loop 14 is coupled from a terminal 15 at the output 13 and is fed through a detector 16. The detector 16 converts the AC output to a DC signal which is then fed to a circuit point 19. The principal charging circuit includes a capacitor 20 which is coupled from a circuit point 21 to ground at circuit point 22. A discharge resistor 23 is coupled in parallel with the capacitor 20 through a switch 24 to circuit ground at the point 22. By opening and closing the switch 24 in accordance with a predetermined time interval as determined by a timing circuit 25, the discharge of the capacitor 20 can be regulated. The circuit point 21 is then coupled through a driver amplifier 26 to a feedback input 27 of the gain controlling device 11.

In operation, when a high level signal appears at the output 13, this signal is coupled through the detector 16. The DC signal then immediately charges the capacitor 20 and is conducted through the driver circuit 26 to reduce the gain of the gain controlling device. With the gain reduced, the output signal drops and this would tend to produce a feedback signal for increasing the gain immediately. However, the capacitor 20 remains charged to the high voltage level until the switch 24 is closed. The timing circuit 25 is arranged to close the switch 24 after the lapse of a predetermined time interval following the initiation of the high voltage signal at the output 13. This eliminates the"distortion" which is undesirable.

Figure 2:
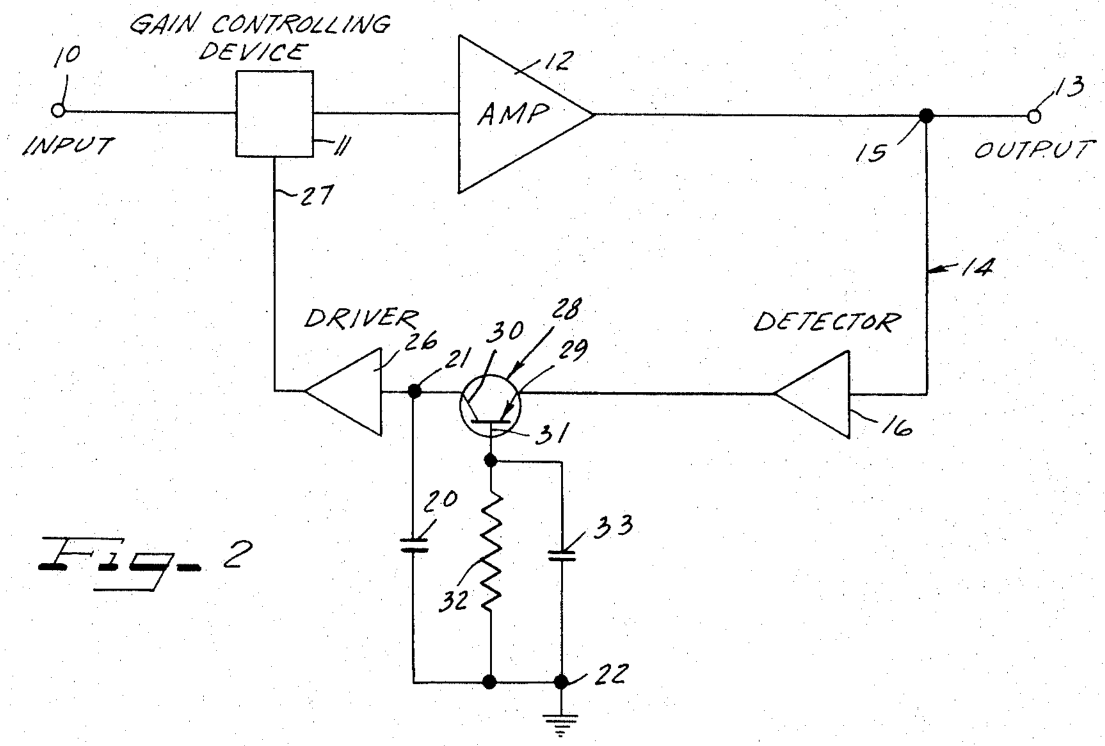
FIG. 2 is an illustration of a further embodiment showing the use of a transistor and a parallel RC charging circuit coupled to the base thereof for performing the switching and timing arrangement performed by the switch of FIG. 1.

FIG. 2 is similar in many respects to FIG. 1, and accordingly reference numerals have been carried to FIG. 2 from FIG. 1. In FIG. 2, a transistor 28 is coupled in series with the feedback loop. In particular, the emitter 29 and collector terminals thereof are coupled to the driver circuit 26. The base terminal 31 of the transistor is coupled to an RC circuit which includes a resistance 32 and a capacitance 33. The resistance 32 and capacitance 33 are coupled in parallel and are connected to the ground terminal 22.

In operation, the circuit of FIG. 2 produces a high level output signal which is coupled to the emitter of the transistor 28. This high level signal is then coupled directly to the driver circuit 26 and on to the gain controlling device 11 for reducing the gain thereof. The capacitor 20 and the capacitor 33 are charged due to the conduction of the transistor 28. When the output 13 is reduced due to the reduction in gain of the circuit 11, the capacitor 20 holds this charge until the transistor 28 is turned on again. The transistor 28 is turned off by the reduction in signal at the output 13 and by the presence of a charge on the capacitor 33. As the capacitor 33 discharges through the resistor 32, the base of the transistor 28 is lowered in voltage, and the transistor turns on for discharging the capacitor 20 from the collector to the base circuit thereof.

Figure 3:
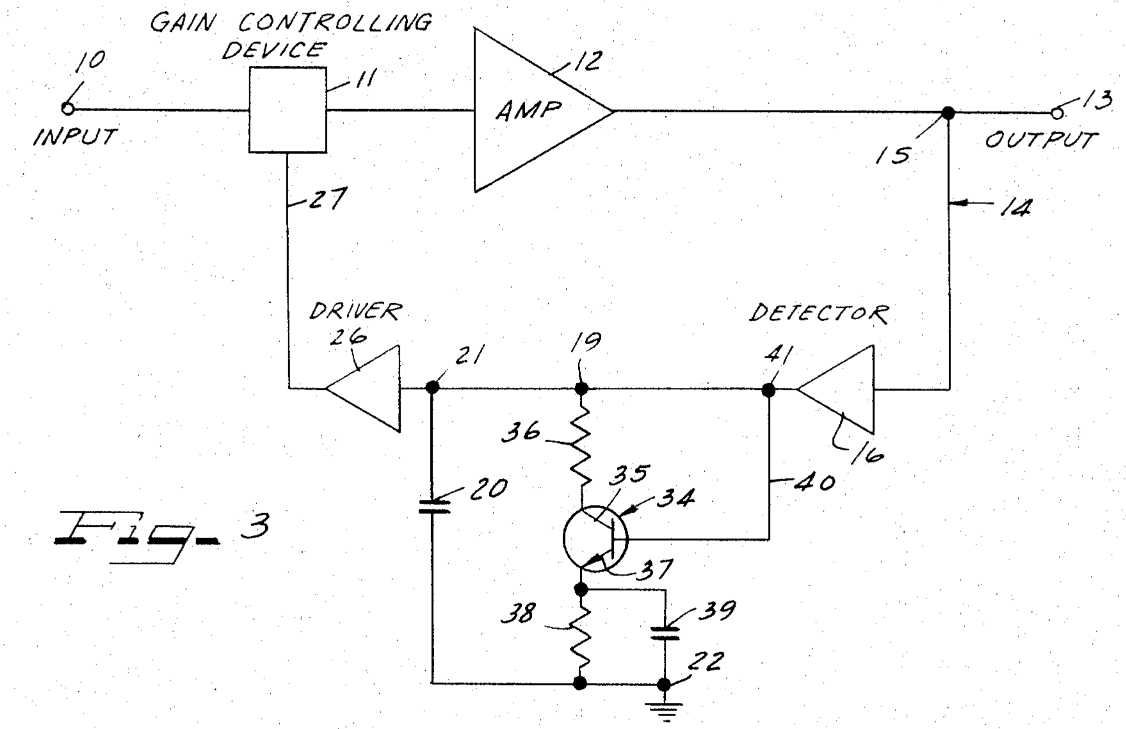
FIG. 3 is a circuit arrangement similar in certain respects to FIG. 2 and illustrating the coupling of an RC timing circuit to the emitter of a switching transistor.

A further embodiment is shown in FIG. 3. Once again reference numerals have been carried from FIG. 1 for like elements of FIG. 3. In FIG. 3 a transistor 34 has a collector 35 coupled through a load resistance 36 to the circuit point 19 and has its emitter 37 coupled through a further resistance 38 to the circuit point 22. A capacitor 39 is coupled in parallel with the resistance 38. The base of the transistor 34 is coupled through a circuit line 40 to a point 41. When a high level signal appears at the output 13, the transistor 34 is turned on, and the capacitors 20 and 39 are charged. At the same time, the output of the gain controlling device 11 is reduced to gain reduction as described above. The output 13 which is then reduced in voltage is uncoupled from the feedback input 27 by means of the detector 16, and the fact that the transistor 34 is turned off due to the presence of a charge on the capacitor 39. As the charge on the capacitor 39 decays, the transistor 34 is then turned on providing a discharge path for the capacitor 20 through the resistances 36 and 38 to circuit ground at point 22. In this way, the voltage at the feedback input 27 is maintained at a high level for a predetermined time interval which is controlled by the time constant of the RC circuits 38 and 39.

Figure 4:
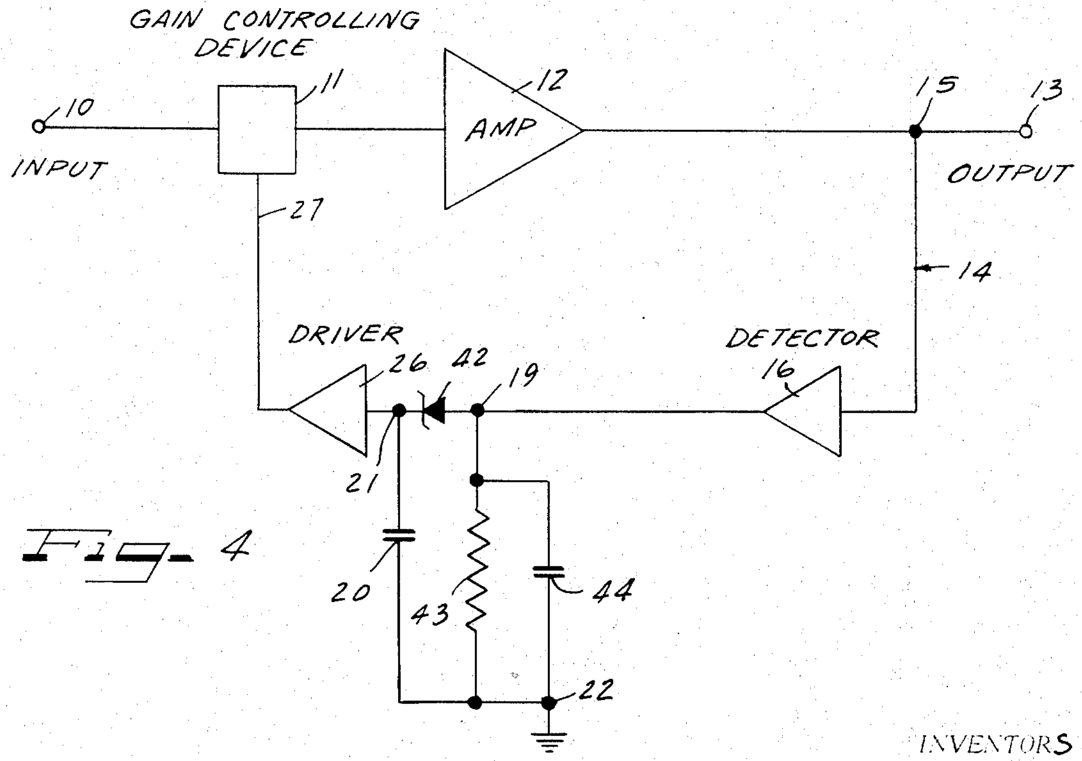
FIG. 4 is a further embodiment of the present invention using a zener diode as the switching element.

FIG. 4 is an example of a further embodiment of the present invention and once again, reference numerals have been carried to FIG. 4 from FIG. 1 for like circuit elements.

In FIG. 4, a zener diode 42 is used as a swithcing element to discharge the capacitor 20. The zener diode is coupled between the circuit points 19 and 21, and an RC parallel combination which includes a resistance 43 and a capacitor 44 is coupled from the anode of the diode 42 to circuit ground at junction point 22. In this case, also, high level signals appearing at the output 13 are coupled directly to the feedback input 27 to reduce the gain of the circuit 11. The reduction in signal level at the output 13 is then uncoupled from the input 27 by means of the detector 16, and the fact that a charge has been developed on the secondary charging circuits 43 and 44. Once the charge 44 is dissipated through the resistance 43, the capacitor 20 is free to discharge through the zener diode 42 and the resistance 43.

In each of the above embodiments, the reduction in gain following a high level output signal is uncoupled from the feedback circuit for a predetermined time interval to prevent distortion or pumping.

We claim as our invention:

1. A signal limiter comprising: a gain controlling means, a detector coupled to an output of said controlling means for developing a DC signal therefrom, means coupling an output of said detector to an input of said gain controlling device for regulating the gain thereof when a relatively high level signal is developed at the output of said detector, means for holding said input of said gain controlling device at a relatively high level for a given time interval after the lapse of said relatively high level signal at the output of said detector, means for reducing the signal level at the input of said gain controlling device after the lapse of said given time interval when the output of said detector is at a relatively low signal level, said means for reducing the signal level at the input of said gain controlling device after the lapse of said given time interval including a switching device coupled in parallel with said means for holding said input of said gain controlling device at a relatively high level, means for opening and closing the switching device at predetermined time intervals, said means for opening and closing the switching device at predetermined time intervals including a charging and discharging circuit for building up a charge at high signal levels and for discharging according to said given time interval, said switching device being zener diode.

2. A signal limiter comprising: a gain controlling means, a detector coupled to an output of said gain controlling means for developing a DC signal therefrom, means coupling an output of said detector to an input of said gain controlling device for regulating the gain thereof when a relatively high level signal is developed at the output of said detector, a point of reference potential, a control circuit coupled from the input of the gain controlling device to the point of reference potential, said control circuit including the parallel combination of a capacitor and transistor, said capacitor holding said input of said gain controlling device at a relatively high level for a given time interval after the lapse of said relatively high level signal at the output of said detector, control means for turning on said transistor to discharge said capacitor after the lapse of said given time interval when the output of said detector is at a relatively low signal level, and said transistor having a conduction path in series with said control means.

3. A signal limiter in accordance with claim 2 wherein said control means for turning on said transistor comprises a charging and discharging circuit for building up a charge at high signal levels and for discharging according to said given time interval.

4. A signal limiter in accordance with claim 3 wherein said charging and discharging circuit is coupled to one of the terminals of said transistor for controlling the conduction or non-conduction thereof.

5. A signal limiter in accordance with claim 4 wherein said charging and discharging circuit is coupled to the emitter of said transistor.

6. A signal limiter in accordance with claim 4 wherein said charging and discharging circuit is coupled to the base of said transistor.

* * * * *